UNITED STATES PATENT OFFICE.

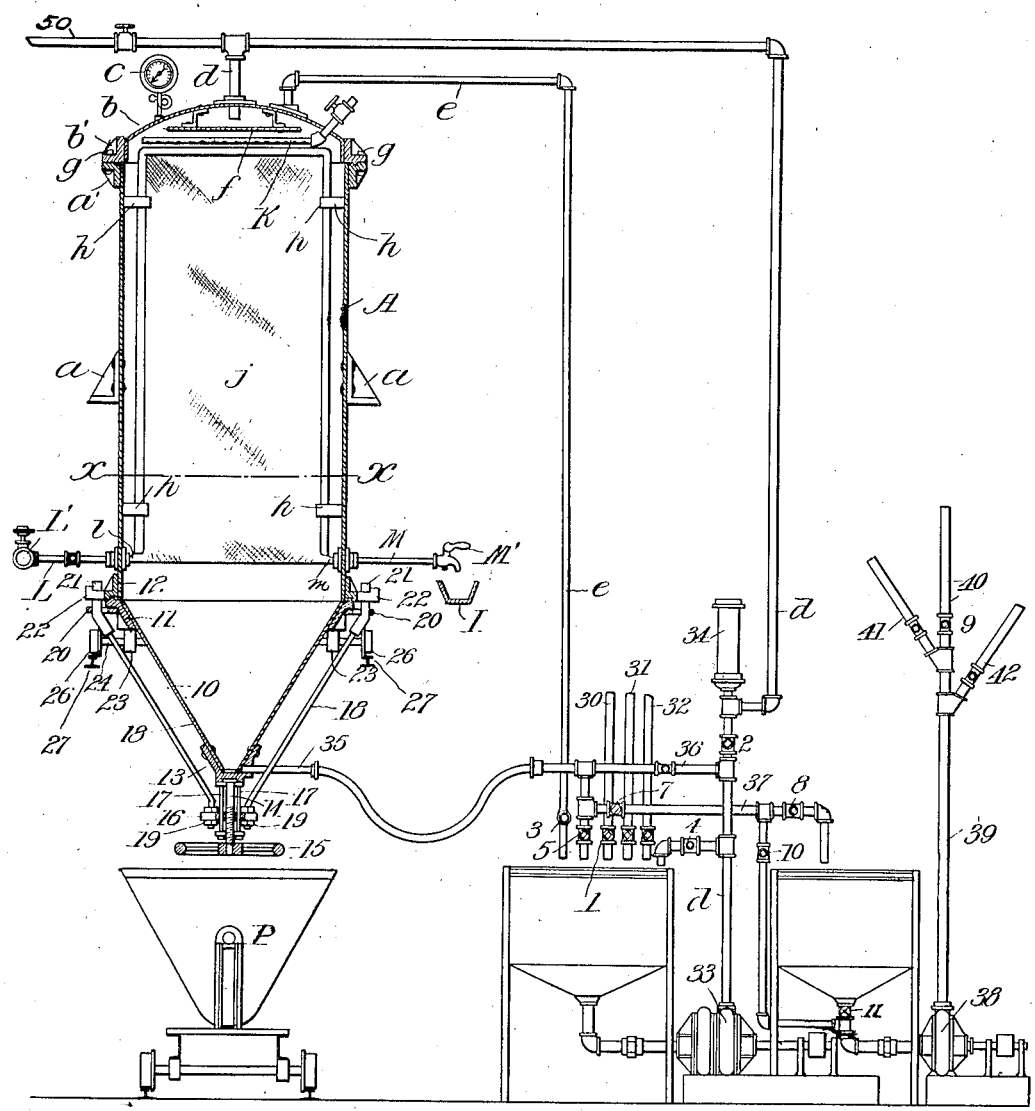

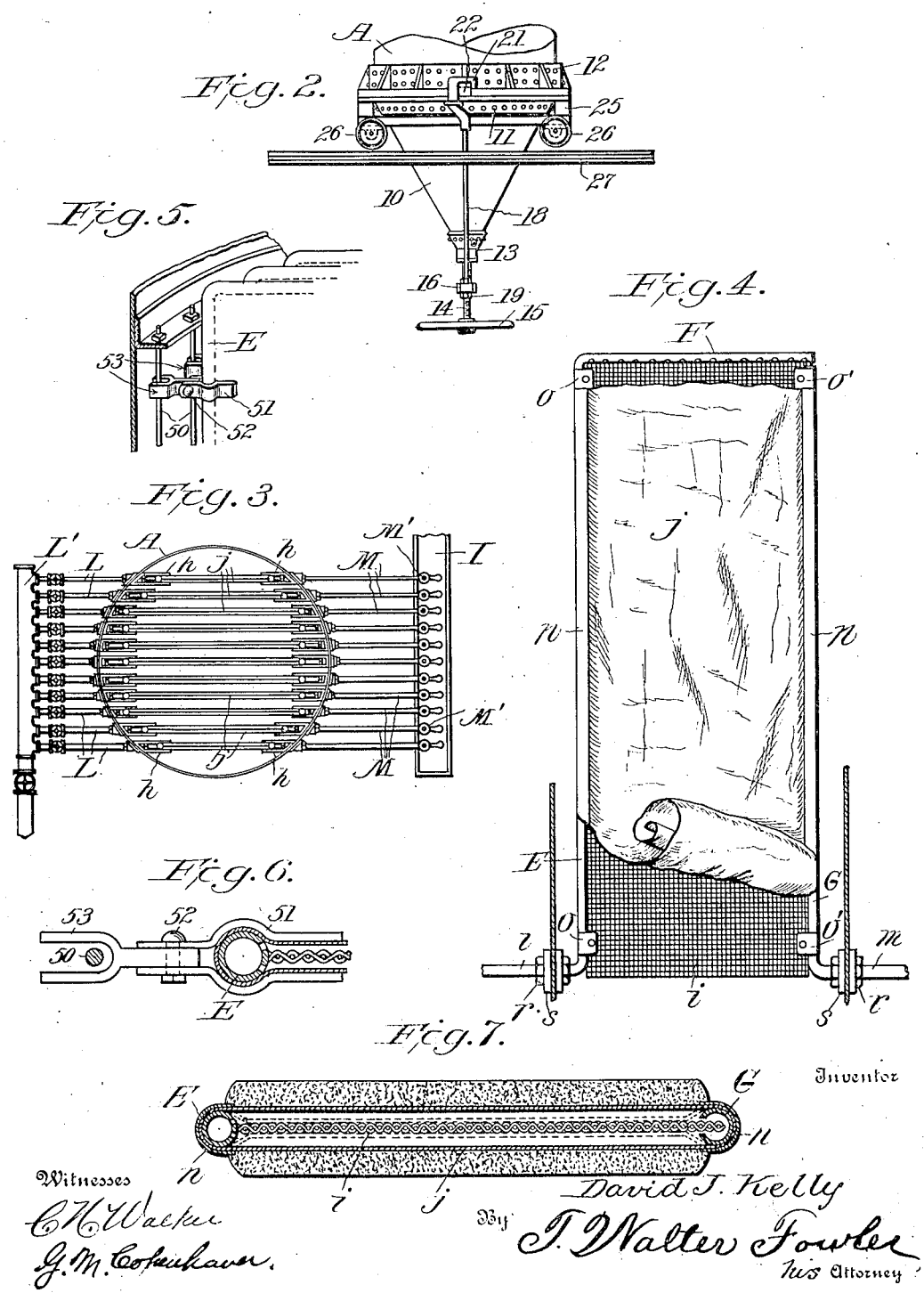

DAVID J. KELLY, OF SALT LAKE CITY, UTAH, ASSIGNOR TO THE KELLY FILTER PRESS CO., OF SALT LAKE CITY, UTAH, A CORPORATION OF UTAH.

FILTERING APPARATUS.

No. 869,372.   Specification of Letters Patent.   Patented Oct. 29, 1907.

Application filed January 5, 1907. Serial No. 350,971.

*To all whom it may concern:*

Be it known that I, DAVID J. KELLY, a citizen of the United States, residing at Salt Lake City, in the county of Salt Lake and State of Utah, have invented new and useful Improvements in Filtering Apparatus, of which the following is a specification.

My invention relates to certain new and useful improvements in apparatus for separating liquids from solids, and particularly to an apparatus which is adapted for the treatment of valuable mineral-bearing slimes to remove the solid materials from the liquid; the apparatus is also useful in other fields as well as the metallurgical industry, for instance, said apparatus will be found of value in separating the liquid matter, as molasses or wash water, from the massecuite or solid matter in the manufacture of sugar.

My invention consists of the parts and the constructions and combinations of parts which I will hereinafter describe and claim.

In the accompanying drawings forming part of this specification and in which similar reference characters indicate like parts in the several views,—Figure 1, is a diagrammatic view of a system of apparatus embodying my invention, the filtering tank being shown in vertical section. Fig. 2, is a side elevation of the wheeled carrier for supporting and transporting the movable bottom of the tank to one side of the vertical plane of the tank when it is desired to discharge the solid contents of said tank. Fig. 3, is a horizontal sectional view on the line $x$—$x$ of Fig. 1. Fig. 4, is a detail of one of the filter diaphragms showing parts broken away. Fig. 5, represents a modified guide and clamp for the filter diaphragms. Fig. 6, is an enlarged plan view of one of the modified guides and clamps of Fig. 5, showing the perforated pipe in cross section. Fig. 7, is an enlarged cross sectional view of a diaphragm showing caked material on the filter sides thereof, the dotted lines showing the position of the filter sides when under the influence of external pressure.

In carrying out my invention I employ a stationary, vertically disposed pressure tank A of any desired horizontal cross section, having suitably supported or contained within it, a series or battery of vertically arranged filter diaphragms.

The tank A is made of any desired material and size and has sufficient strength to withstand the internal pressure to which it is subjected, as well as the weight of the filter diaphragms and the solid matter collected upon their outer sides in the form of cakes. While the apparatus is, as before mentioned, suitable for the treatment of various substances to separate the liquid from the solid contents, I will in the following description consider the apparatus as intended for the treatment of valuable mineral-bearing slimes and particularly to an apparatus for filtering the same, so as to remove by filtration, the solid constituents thereof.

The tank A is intended to be stationary and to be maintained in an upright or vertical position upon a suitable framework or support and to this end I prefer to rivet or otherwise secure to the outer sides of the tank, the supporting lugs *a*.

The tank is open at both ends, but has removable closures for said ends, as I will now explain. The closure for the upper end is in the form of a head *b* to which is connected a pressure gage *c* and the pipe *d* through which the slimes are conducted to the tank; an overflow pipe *e* also connects with the head *b*, and in the head under the delivery end of the supply is fixed a baffle plate *f* for deflecting the course of the slimes received thereon.

To the rim of the head *b* is riveted or otherwise secured an angle-iron or other band or ring *b'*, and to the upper end of the tank A is secured a similar band or ring *a'*, these two bands or rings having their horizontal flanges seating one on the other and being removably secured by bolts *g*. To assist in obtaining a liquid tight joint between the removable head and the upper end of the tank, I may form one of the horizontal flanges of the rings with a groove and form the flange of the other ring with a tongue to engage said groove and a suitable packing or gasket therein.

At suitable points on the interior of the tank I bolt or otherwise secure the horizontal guides *h* these guides being oppositely arranged and being substantially of U-form and serving as means for spacing and guiding the vertical or upright filter diaphragms D upon the outer sides of which the solid constituents of the material being treated are collected and caused to adhere.

The filter diaphragms may be of any desired number arranged in battery or parallel series and are spaced from each other and from the inner sides of the tank as shown.

Each filter diaphragm comprises a foraminous or reticulated sheet or plate *i* of metal or other suitable material over which is secured the fabric covering *j*. Wire cloth, especially that of the well known double-crimped type is well adapted for the internal plate and forms a light and yet rigid and substantial backing for the fabric covered sides, which latter may represent canvas or other suitable textile material of sufficient but fine mesh to allow the liquid matter to pass through and yet prevent the passage of solid matter which it is designed to collect upon the outer sides of the canvas.

In practice, the canvas or fabric is substantially in the form of a bag and completely surrounds the inner foraminous plate, as well as the pipes G and E hereinafter mentioned, whereby the only points of communication to the interior of the filters are through the meshes or pores of the canvas or fabric and through the nipples $l$ and $m$ of inlet and outlet pipes L and M hereinafter described.

To facilitate the removal of the slime cakes and to prevent the solid matter from building up around the edges of the filter diaphragms and connecting the cakes formed on two opposite sides thereof, I have found it desirable to bind the edges of said diaphragms, or bags, with an impervious substance, such as sheet tin, iron, rubber cloth, or other suitable material, as shown at $n$.

Each filter has securely attached along one of the vertical sides of its foraminous or screen plates, as by the appropriate clips $o$, the pipe E while along the top edge of the said plate is secured a pipe F having numerous small holes adapted to project jets of a suitable gas or liquid, but preferably steam, downward and outward against the upper edges of the interior surface of the canvas or fabric sides or bags, it being understood that the pipe E suitably connects with a valve controlled supply pipe L leading from a suitable main L' or other source of supply, and that said pipes E and G are contained within the canvas or other fabric bags. Within the other side of the filter bag and secured along the other long side of the foraminous or screen plate $i$ by the clips $o'$ is the pipe G which pipe is slotted longitudinally along its inner side to receive the edge of said plate and to form a common channel for filtered liquid to be delivered to and through said pipe to the outlet pipe M through which latter pipe the said liquid passes to the outside of the tank and into an appropriate launder I.

While various forms of fittings may be used, I show nipples $l$, $m$, passing through holes in the sides of the tank, and connected by ells to the lower ends of the pipes L and M which nipples serve to further support the filter diaphragm and also to act as spreaders at the lower ends. Lock nuts $r$ are employed to clamp washers $s$ against suitable gaskets to prevent leakage through the tank around said nipples.

In the upper or head end of the tank is also secured a series of pipes K one in or over each space between the filter diaphragms as shown and the purpose of which pipes is to admit a spray for cleaning the filter cloths.

One of the most important features of my invention resides in the means for discharging accumulated solid material from the filters, and to this end I construct the tank with a removable hopper-like bottom and means whereby it may be detachably locked to the tank during the operation of the filter, and then unlocked and removed horizontally from under the vertical tank to allow the slime-cakes to be delivered into a slime dump car P appropriately placed in line beneath the tank.

The removable bottom 10 forms the closure for the lower open end of the tank. As shown, it is of inverted conical or hopper form and has bolted to its upper or larger end an angle-iron or flanged ring or band 11 which coacts with a flanged band or ring 12 bolted around the lower end of the tank, to form a liquid-tight joint between said tank and the removable bottom, substantially in the manner before described for the rings or bands $a'$ and $b'$ at the upper or head end of the tank.

The lower or smaller end of the removable bottom 10 has riveted or otherwise secured to it a casting 13 in which is turnably mounted the upper end or head of a vertical tightener-screw 14 having an operating hand wheel 15. This screw operates through a suitable tightening nut 16 which is pierced to receive guide bolts or rods 17 fixed to and depending from the casting 13 whereby the bottom 10 is accurately guided in its opening and closing movements.

Suitable tightening rods 18 arranged parallel with the upwardly diverging sides of the conical or hopper bottom 10 have their lower ends fixed by nuts 19 to lugs on the opposite ends of the tightening nut, said rods 18 passing through guides 20 and having hook-shaped upper ends forming dogs 21 which are adapted to engage lugs 22 projecting from the ring or band 12 on the lower end of the tank. The movable bottom 10 is also provided with boxes or bearings 23 in which are journaled the horizontal shaft or axles 24 of the carrier 25 the wheels 26 of which are adapted to travel upon a track 27 when the bottom is unlocked from the tank and lowered to engage the wheels with the track, and it is desired to remove the bottom from under the tank to allow the slime cakes to be discharged into the beforementioned slime dump car.

Associated with the tank I have shown means for providing a circulation during filtration, of the material to be separated, these means including a slime pulp supply pipe 30, a leaching solution supply pipe 31 and a washing supply pipe 32 these pipes leading from suitable sources of supply. These pipes are valve-controlled and they and the overflow pipe $e$ deliver to the feed end of a pressure pump 33 from which the delivery pipe $d$ leads, an air cushion 34 being provided in said pipe. To the removable bottom is also coupled a drain and circulating pipe 35, having a flexible connection which connects by pipe 36 with the delivery pipe of the pump 33. A pipe 37 forms a drain for the excess solutions and it delivers into the hopper-end of a pump 38 whose delivery pipe 39 has branches 40, 41 and 42 leading, respectively, to the slimes supply tank, the leaching solution tank and the washing liquid tank.

These several pipe connections will be better understood in connection with the following description of the operation of the apparatus: The removable bottom 10 having been securely attached to pressure tank by the tightening mechanism shown or other suitable means, the tank is ready to be filled with material to be filtered or separated. By opening a cock (1) in the slimes pulp supply pipe 30, the centrifugal pump 33 (which may be of the single or multiple stage) being in motion causes the slime pulp to pass along the suction pipe of this pressure pump and then up the delivery pipe $d$ and into the pressure tank A. As the pressure tank is filled with slime pulp, the air in the tank is displaced and escapes through the overflow pipe $e$. An overflow of slime pulp through this pipe $e$ indicates when the tank is filled, and the valve 3 is then closed. A series of valves M' controlling the outflow of filtered liquid from filters remain open so long as liquid comes out clear; but in case of a filter becoming faulty and leaking slime pulp the valve controlling it may be closed. The pressure tank, having been filled with slime pulp the filter diaphragms are surrounded by the same, and the clear liquid passes through the canvas bags to the interior and thence through suitable channels to the individual outlet pipes M which discharge into a common launder which is placed in a suitable position outside pressure tank. The solid matter meanwhile collects upon the exterior surfaces of filter diaphragms and, as this filtration is dependent upon pressure, means are shown whereby any desirable pressure is maintained. The two-stage pump 33 shown in the drawings supplies the pressure; and valve 4 regulates the degree of pressure. Valve 5 regulates the circulation of slimes pulp in the pressure tank during filtration. For instance, if it is desirable to keep up a rapid circulation in the tank, then valve 5 can be opened wide.

In practice, the pumps are designed to deliver slimes pulp against a certain resistance or head. The maximum pressure available in the tank therefore depends upon the speed of the pumps. If the outflow of liquid from the tank is as rapid as the inflow, the pressure will be small; but if the outflow is hindered the pressure increases, reaching its maximum when the outflow is completely stopped. Therefore valve 5 can be regulated to give any desired circulation in the tank, or to govern pressure, or both. Valve 4 which is on a pump by-pass, can also be used to advantage to regulate pressure in the tank. In short, by means of the valve arrangement shown, the pressure can be regulated and the circulation controlled during filtration.

When it is considered desirable to discharge the accumulated solid matter from the sides of the filter bags, the excess slime pulp is run out of the pressure tank and returned to the slimes pulp supply tank through the pipe 40. In practice this can be done in two ways: First, compressed air admitted through a pipe 50 can be used to displace the excess slime pulp. This is done by closing the valve 2 and opening the valve 9 and the drain valves 7 and 8. By opening the valve 9 in the pipe 40 leading to slimes pulp supply this excess is returned. Valve 7 is closed as soon as all the solution is expelled from the tank, and the air, having displaced the excess pulp, now surrounds the filter diaphragms and "blows" or compresses the accumulated slime cakes, thus displacing the excess liquid in the same, and admitting of their discharge in a more dry and compact condition. Another way to empty the tank, if it seems unnecessary to blow the slime cakes with air, is to close valves 2 and 11 and open valves 3, 7 and 10, thus drawing pulp through suction pipes of pump 38 and returning it to the source of supply through slimes pulp return pipe 40. In this case the cakes would retain a greater amount of moisture than in the first case. The excess solution having been removed from the pressure tank by either of the methods described, the hopper-shaped bottom 10 is removed as follows:—The hand-wheel-operating tightening-screw 14 is turned to the left, causing the bottom 10 to recede from the tank until the wheels of the traveling carrier 25 engage the tracks 27 whereupon the entire weight of the detachable bottom with its carrier is transferred from the lugs 22 on the ring or flange of the pressure tank, to the tracks 27 engaged by carrier wheels. As the hand wheel is turned further to the left in nut 16 the wheels of the carrier having engaged the track 27, the nut and attachments are raised, thus disengaging the dogs 21 from the lugs 22 and the carrier is then caused to move horizontally along the tracks far enough to permit the free fall of the slime cakes into the slime dump-car below. To attach and tighten the bottom 10, the operation is reversed.

I prefer to discharge the slime cakes by means of air, steam, or other gas, or by means of water, or other liquid or solution, introduced under pressure inside of filter bags. When steam is used it is delivered into the space between the porous inner sides of the filter and expands in said space and penetrates the pores of the canvas and attacks the inner sides of the slime cake and forms a slimy surface which enable the cake to readily detach from the filter. When cakes have been discharged the hopper-shaped bottom is again run back directly under the tank and clamped; the apparatus is then ready for another cycle of operations.

In some instances it is desirable to leach or wash the cakes after they are formed on, and before they are discharged from, the sides of filter-bags. This can be accomplished as follows: The slimes pulp supply is shut off by turning the cock 1 and a leaching, or washing, liquid drawn from some suitable source of supply, is supplied to the pressure pump 33, from which it flows into the top of the pressure tank, displacing slimes pulp which is simultaneously withdrawn from the bottom of the tank, passing through the opened valves 7 and 8. The baffle plate $f$ is a disk placed inside the top of the pressure tank directly below the end of the delivery pipe $d$, and acts as a distributer: it also prevents a mixture of the leaching or wash solution during displacement, that is, it serves to make an alinement between the displacing and displaced liquids. If, however, it is desired to remove slimes pulp from the tank before introducing the leaching or wash solution into the same, this can be accomplished by withdrawing from the bottom of the tank, through valves 7 and 10, air being admitted through the valve 3 or the valve 6 may be slightly opened to supply air under pressure to prevent a vacuum being formed in the tank. When the slimes pulp solution is all withdrawn the leaching or wash solution may be delivered at the lower end of the tank by opening the valve 12 and completely filling the tank. The pump pressure now forces the leaching or wash solution through the slime cakes on the filter diaphragms, thus displacing any of the original solutions retained by the slime cakes in the first operation. In some cases, it may be desirable to treat the slime cakes to a leaching or wash solution, or both, after they have been formed on the filter diaphragms. This can be readily accomplished by the means above described. The excess solutions can be duly returned to their respective supply tanks.

The upper, or top end of the tank is designed in detachable form to admit of its occasional removal, if necessary, for setting up, repairing, or cleaning the apparatus.

The air cushion 34 in the main pump delivery line $d$ serves to prevent, or equalize, any sudden variations in pressure.

In Figs. 5 and 6, I illustrate a modified form of guide and clamp for the filter diaphragms and wherein suitable vertical rods 50 are appropriately held spaced from the inner wall of the tank, and suitable clamps 5' embrace the edges of the diaphragm and are clamped thereto by means of bolts 52 to which are pivoted links 53 having forked outer ends to receive the aforesaid rods 50. This form of guide or spacer has much merit when used in connection with a vertical type of filter; it is designed to make the operation of replacing the filter diaphragms more easily and accurately performed.

Having thus described my invention, what I claim as new and desire to secure by Letters Patent is,—

1. In an apparatus of the character described, the combination of a stationary tank, a pressure filter supported therein, a detachable bottom for said tank, and means for detachably locking the bottom to the tank during filtration, said locking means including projections on the tank, tightening-rods carried by the bottom and adapted to engage said projections, a screw engaging said bottom and a nut carried by the said rods and through which said screw operates.

2. In an apparatus of the character described, the combination of a stationary filter tank, a bottom therefor of hopper-like form, and coacting locking means between said bottom and the tank whereby the bottom is removably attached to the tank, said locking means including projections on the tank, tightening-rods movable with the bottom and adapted to engage said projections, and means for moving the bottom relative to the tightening-rods to cause it to close tightly against the open end of the tank.

3. In an apparatus of the character described, the combination with a filtering tank and a hollow filtering medium contained therein and upon the outer sides of which the solid material accumulates in cake form, of a removable bottom for said tank said bottom being independent of the filter and adapted to uncover the bottom of the tank to allow the accumulated solid matter to be delivered by gravity from the tank, and securing means for the bottom, said means including projections on the tank and tightening-rods movable with the bottom and adapted to engage said projections, and means for moving the bottom relative to the tightening-rods after the latter has engaged said projections, whereby the bottom is clamped tightly against the open end of the tank.

4. In apparatus of the character described, the combination of a stationary tank, a pressure filter supported therein, a removable hopper-like bottom for the tank, detachable connections between the tank and bottom, said connections comprising lugs on the tank and tightening-rods having upper ends to engage said lugs, and follower means adapted to exert a pressure upon said bottom and the tightening-rods simultaneously in opposite directions, thereby seating the bottom and also causing said connections to tighten said seating.

5. In apparatus of the character described the combination of a stationary pressure tank, a pressure filter supported therein, a removable hopper bottom for the tank, a screw turnably mounted on the lower end of said bottom, a tightening-nut through which said screw passes, and tightening rods fixed to the nut and extending upwardly and having locking members at their upper ends, said tank having locking members with which the first-named locking members engage to hold said bottom tightly but removably against the lower end of the tank.

6. In apparatus of the character described the combination of a tank having locking lugs at its lower end, a pressure filter within said tank, a removable hopper bottom for the tank, tightening-rods guided on said bottom and having hook-shaped members at their upper ends to engage the locking lugs on the tank, a nut to which the lower ends of said rods are fixed, a screw turnably mounted on the under side of said bottom and passing through said nut, and means for operating the screw whereby said bottom is tightly but removably seated against the lower end of the tank.

7. In apparatus of the character described the combination of a tank having spacing guides fixed to its inner sides, a series or battery of filter diaphragms engaging said guides, means for detachably securing the diaphragms in position in the tank, said diaphragms having an internal screen plate and a fabric covering therefor, and an impervious binding around the edges of the filter diaphragm adapted to facilitate the removal of the solid material by preventing the same from building up around the edges of the diaphragm and connecting cakes on opposite sides of the same diaphragm.

In testimony whereof I have hereunto set my hand in presence of two subscribing witnesses.

DAVID J. KELLY.

Witnesses:
ALBERT L. O. GENTER,
ERNEST GAYFORD.